Dec. 29, 1931.  G. C. CAPPA  1,838,806

ARRANGEMENT OF THE GENERATORS ON AIR COOLED INTERNAL COMBUSTION ENGINES

Filed Aug. 22, 1930

Patented Dec. 29, 1931

1,838,806

UNITED STATES PATENT OFFICE

GIULIO CESARE CAPPA, OF TURIN, ITALY, ASSIGNOR OF ONE-HALF TO SOCIETA ANONIMA AUTOMOBILI ANSALDO, OF TURIN, ITALY

ARRANGEMENT OF THE GENERATORS ON AIR-COOLED INTERNAL COMBUSTION ENGINES

Application filed August 22, 1930, Serial No. 477,103, and in Italy August 29, 1929.

The arrangement of the generator on air-cooled internal combustion engines for the electric equipment of motorcars is not free from difficulties owing to the fact that if arranged in the usual manner the generator is subjected to the stream of hot air issuing from the lower end of the cylinders and is brought to an exceedingly high temperature which is detrimental to the working and life of the generator, said heat adding itself to that transmitted by conduction by the engine and that generated in working.

This invention removes the above mentioned drawbacks by arranging the generator on the suction side of the fan employed for the forced air circulation, and is preferably keyed on the fan shaft, which results in a simpler construction of the operating means and in a more compact engine block.

The annexed drawings show by way of example a constructional form of this invention.

Figure 1:
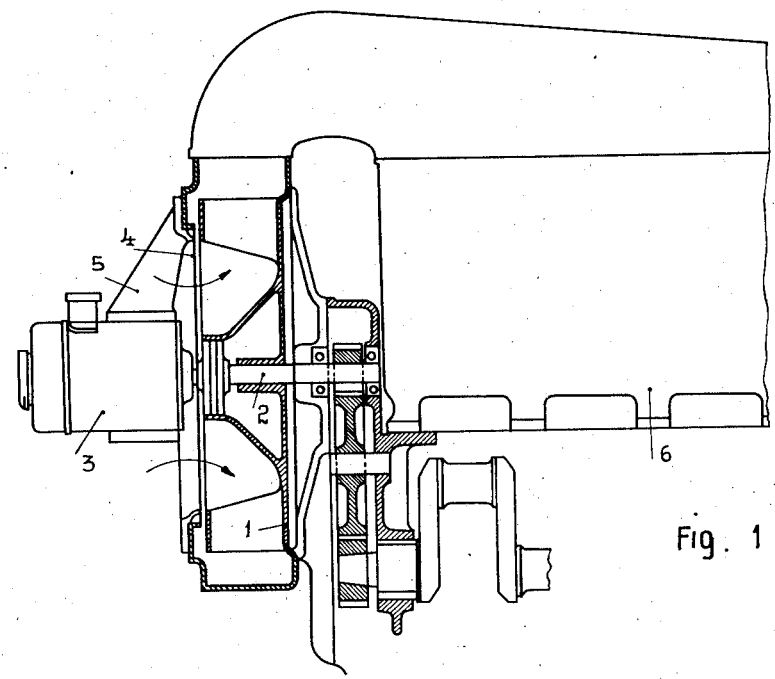
Figure 2:
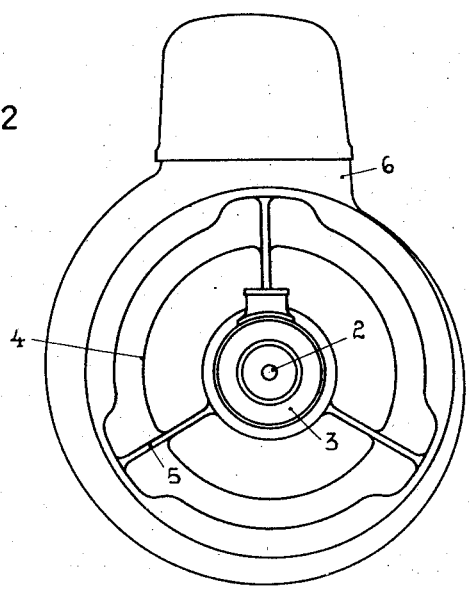

Figure 1 is a longitudinal section;
Figure 2 is an end view of an air cooled engine provided with the arrangement according to this invention.

Referring to the drawings, 6 denotes an engine of the type above referred to provided with a fan 1 for the forced air circulation arranged on a shaft 2, operated by the engine through a suitable transmission gear. According to this invention the generator 3 is keyed on a shaft extending from the shaft 2 and is subjected therefore to a flow of cold air drawn in by the fan 1 through an annular opening 4.

The generator shell can be secured to the ventilator casing, say by means of three or more strong arms 5.

By the above described arrangement the generator temperature is maintained very low by cooling it constantly and in a more efficient manner than is generally the case with water-cooled engines; moreover the engine transmission gear is considerably simplified thus ensuring a smoother and more efficient working.

What I claim is:

In a self-propelled vehicle, an air-cooled internal combustion engine, a jacket for said engine, a ventilating fan for conveying an air current through said jacket, said fan being arranged in front of the engine and being provided with a casing connected with said jacket, said casing having a suction opening disposed on the opposite side of the fan from the engine, a transmission gear for transmitting motion from the engine to the ventilating fan, a box for said transmission gear arranged on the front portion of the engine and adapted to support said ventilating fan, an electric generator arranged in front of the suction opening of the fan casing and operatively connected with the fan and a spider-shaped support fixed to the fan casing for supporting said generator.

In testimony that I claim the foregoing as my invention, I have signed my name.

GIULIO CESARE CAPPA.